United States Patent
Zhang et al.

(10) Patent No.: US 12,474,947 B2
(45) Date of Patent: Nov. 18, 2025

(54) VIRTUAL MACHINE DEPLOYMENT AND HOT-MIGRATION METHODS, VMM UPGRADE METHOD, AND SERVER

(71) Applicant: ZTE CORPORATION, Shenzhen (CN)

(72) Inventors: Min Zhang, Shenzhen (CN); Yi Liu, Shenzhen (CN); Yi Li, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 828 days.

(21) Appl. No.: 17/783,417

(22) PCT Filed: Dec. 2, 2020

(86) PCT No.: PCT/CN2020/133341
§ 371 (c)(1),
(2) Date: Jun. 8, 2022

(87) PCT Pub. No.: WO2021/129332
PCT Pub. Date: Jul. 1, 2021

(65) Prior Publication Data
US 2023/0009596 A1      Jan. 12, 2023

(30) Foreign Application Priority Data
Dec. 25, 2019   (CN) .......................... 201911355638.6

(51) Int. Cl.
*G06F 9/455*    (2018.01)
*G06F 12/10*    (2016.01)
(52) U.S. Cl.
CPC .......... *G06F 9/45558* (2013.01); *G06F 12/10* (2013.01); *G06F 2009/45583* (2013.01)
(58) Field of Classification Search
CPC ................. G06F 9/45558; G06F 12/10; G06F 2009/45583
See application file for complete search history.

(56) References Cited

U.S. PATENT DOCUMENTS

| 2011/0276741 A1 | 11/2011 | Subrahmanyam et al. |
| 2011/0314203 A1 | 12/2011 | Chen et al. |
| (Continued) | | |

FOREIGN PATENT DOCUMENTS

| CN | 103942087 A | 7/2014 |
| CN | 104598303 A | 5/2015 |
| (Continued) | | |

OTHER PUBLICATIONS

International Searching Authority. International Search Report and Written Opinion for PCT Application No. PCT/CN2020/133341 and English translation, mailed Mar. 3, 2021, pp. 1-10.
(Continued)

*Primary Examiner* — Tammy E Lee
(74) *Attorney, Agent, or Firm* — Vivacqua Crane, PLLC

(57) ABSTRACT

A virtual machine deployment method, a virtual machine live migration method, a VMM upgrading method, a server, and a computer-readable storage medium are disclosed. The virtual machine deployment method includes: establishing mapping between a host virtual address (HVA) space for a post-upgrading virtual machine and a host physical address (HPA) space for a pre-upgrading virtual machine according to a mapping relationship between a HVA space for the pre-upgrading virtual machine and the HPA space for the pre-upgrading virtual machine. The post-upgrading virtual machine is deployed on a post-upgrading virtual machine monitor (VMM), and the post-upgrading virtual machine is identical in memory configuration with the pre-upgrading virtual machine running on a pre-upgrading VMM (S110).

15 Claims, 7 Drawing Sheets

(56) References Cited

U.S. PATENT DOCUMENTS

| | | |
|---|---|---|
| 2017/0371691 A1 | 12/2017 | Gunti et al. |
| 2018/0060117 A1 | 3/2018 | Maskalik et al. |
| 2019/0057040 A1* | 2/2019 | Jiang .................. G06F 12/1009 |
| 2019/0114197 A1 | 4/2019 | Gong |
| 2019/0370049 A1 | 12/2019 | Gopalan |
| 2020/0174814 A1* | 6/2020 | Saxena ................. G06F 9/5077 |
| 2022/0156106 A1* | 5/2022 | Zhang ................. G06F 9/45558 |

FOREIGN PATENT DOCUMENTS

| | | |
|---|---|---|
| CN | 104636181 A | 5/2015 |
| CN | 106354543 A | 1/2017 |
| CN | 107168769 A | 9/2017 |
| CN | 107278292 A | 10/2017 |
| CN | 108037980 A | 5/2018 |

OTHER PUBLICATIONS

Hao, J., "Research on Embedded Hypervisor Memory Virtualization Method," Aeronautical Computing Technique, vol. 47, No. 2, Mar. 2017, pp. 125-130.

Liu, H., et al. "Live Virtual Machine Migration via Asynchronous Replication and State Synchronization," IEEE Transactions on Parallel and Distributed Systems, vol. 22, 1999, pp. 1-15.

The State Intellectual Property Office of People's Republic of China. First Office Action for CN Application No. 201911355638.6 and English translation, mailed Aug. 8, 2024, pp. 1-12.

The State Intellectual Property Office of People's Republic of China. Search Report for CN Application No. 201911355638.6 and English translation, mailed Aug. 7, 2024, pp. 1-6.

Zhang, S., et al. "A Security Protection Model for Virtualization Based on Memory Introspection," Journal of Beijing University of Posts and Telecommunications, vol. 40, Jun. 2017, pp. 44-47.

Anonymous. "The x86 kvm shadow mmu," Nov. 25, 2012, https://web.archive.org/web/2012112508 5511/http://kernel.org:80/doc/Documentation/virtual/kvm/nunu.txt.

European Patent Office. Extended European Search Report for EP Application No. 20905775.1, mailed Jan. 2, 2023, pp. 1-9.

* cited by examiner

Establish mapping between a host virtual address (HVA) space for a post-upgrading virtual machine and a host physical address (HPA) space for a pre-upgrading virtual machine according to a mapping relationship between the HVA space for the pre-upgrading virtual machine and the HPA space for the pre-upgrading virtual machine, where the post-upgrading virtual machine is deployed on a post-upgrading virtual machine monitor (VMM) and memory configuration of the post-upgrading virtual machine is identical with that of the pre-upgrading virtual machine running on a pre-upgrading VMM — S110

FIG. 1

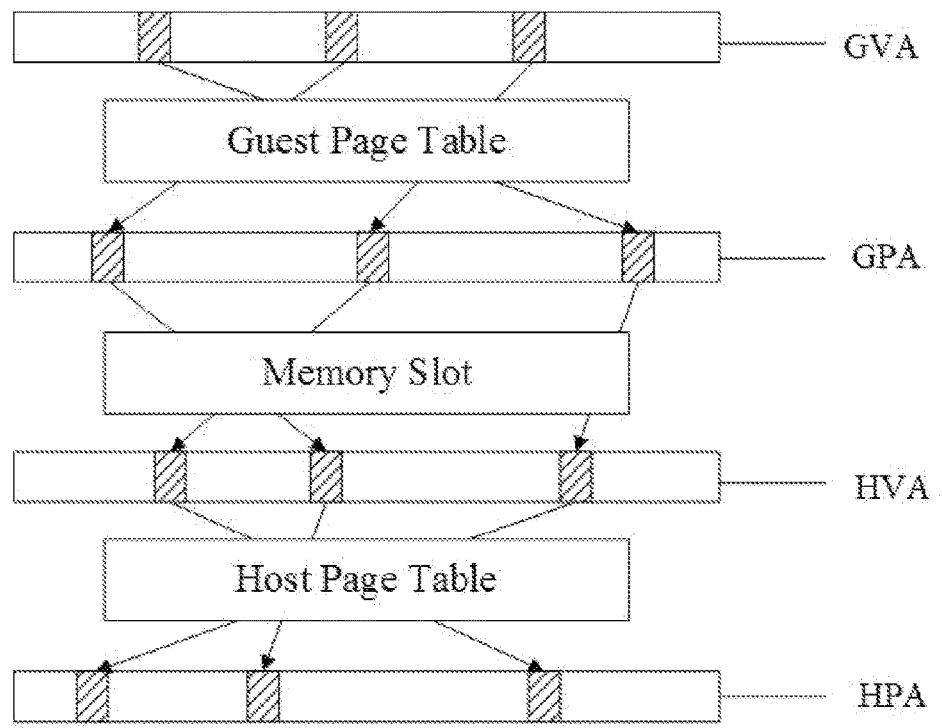

FIG. 2

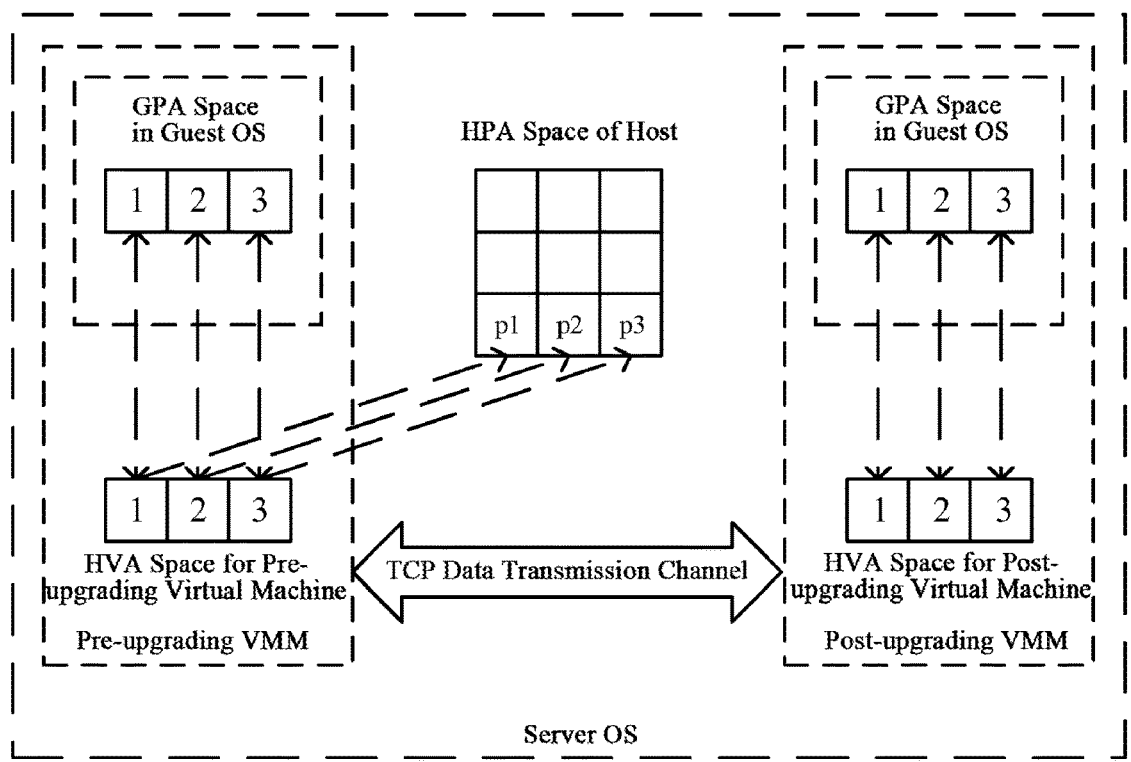
(a)
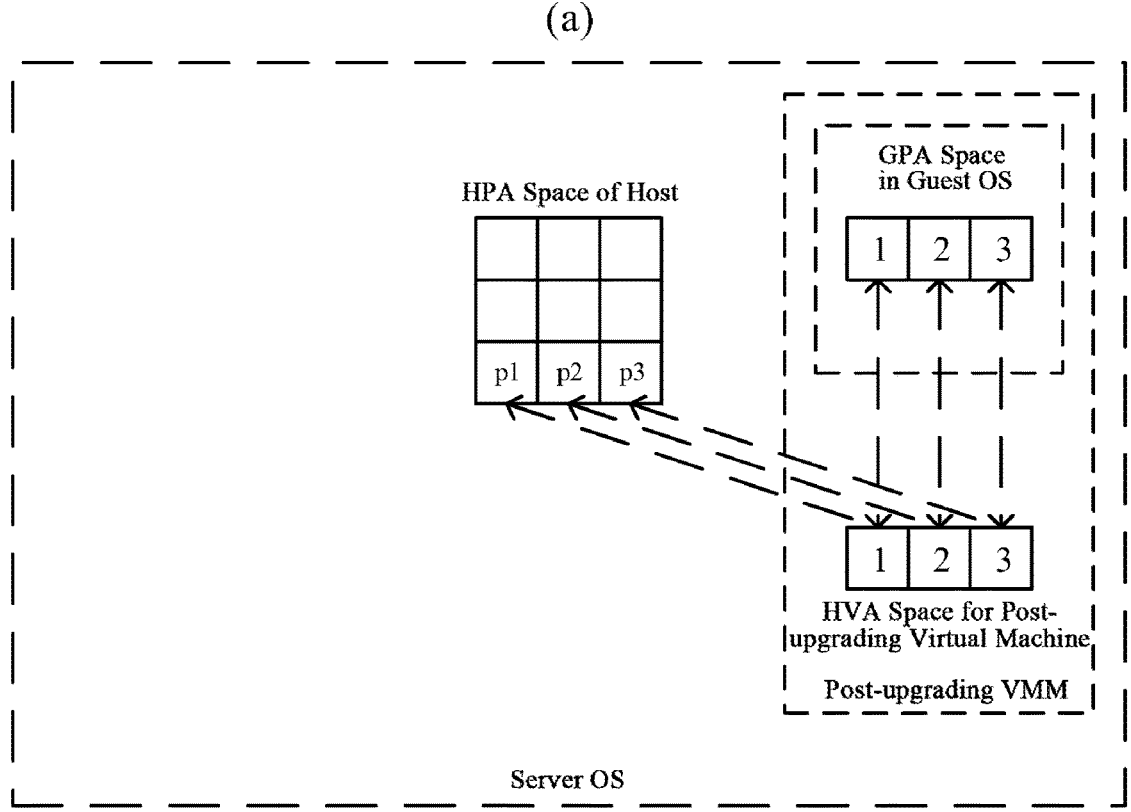
(b)
FIG. 10

VIRTUAL MACHINE DEPLOYMENT AND HOT-MIGRATION METHODS, VMM UPGRADE METHOD, AND SERVER

CROSS-REFERENCE TO RELATED APPLICATION

This application is a national stage filing under 35 U.S.C. § 371 of international application number PCT/CN2020/133341, filed Dec. 2, 2020, which claims priority to Chinese patent application No. 201911355638.6 filed Dec. 25, 2019. The contents of these applications are incorporated herein by reference in their entirety.

TECHNICAL FIELD

The present disclosure relates to the technical field of computers, and in particular to a virtual machine deployment method, a virtual machine live migration method, a VMM upgrading method, a server, and a computer-readable storage medium.

BACKGROUND

A virtual machine monitor (VMM) is a program for running and monitoring virtual machines. In order to upgrade the virtual machine monitor to increase functionality or repair program bugs, it is required to migrate the virtual machines running on the VMM. In order not to affect or interrupt the running of service virtual machines during migration, the existing technology is mainly implemented by a method of on-line virtual machine migration combined with cold patching for software. Specifically, there may be two types of migration: remote migration, that is, a virtual machine of a server to be upgraded is live migrated on line to another server first, a VMM is then upgraded by the cold patching method, and finally, the virtual machine is live migrated on line back to the upgraded VMM for running; and local migration, that is, a new version of VMM program and an old version of VMM program are started on a server host at the same time, and a local migration technique is then employed to live migrate a virtual machine from the old VMM to the new VMM on line.

The essence of the above two methods of on-line migration combined with cold patching is that computing resources for a virtual machine are copied first and released later. In the process of execution, contents in the whole memory space for the virtual machine need to be copied, so a computing resource which is at least equal to the memory space for the migrated virtual machine is required to be reserved in another server or a local server before execution. However, in general, computing resources have already been allocated according to actual services in practice, moreover, in a scenario of cloud computing server virtualization, memory spaces for some virtual machines used as servers are often up to tens or hundreds of GB, so it is difficult to reserve resources. Moreover, when a larger number of virtual machines need to be migrated, the whole process of implementation will be very complex and take a great deal of time and labor.

SUMMARY

In order to solve at least one aspect of the aforementioned problems, the present disclosure provides a virtual machine deployment method, a virtual machine live migration method, a VMM upgrading method, a server, and a computer-readable storage medium.

In accordance with an aspect of the present disclosure, provided is a virtual machine deployment method, including: establishing mapping between a host virtual address (HVA) space for a post-upgrading virtual machine and a host physical address (HPA) space for a pre-upgrading virtual machine according to a mapping relationship between a HVA space for the pre-upgrading virtual machine and the HPA space for the pre-upgrading virtual machine. The post-upgrading virtual machine is deployed on a post-upgrading virtual machine monitor (VMM), and the memory configuration of the post-upgrading virtual machine is identical in memory configuration with the pre-upgrading virtual machine running on a pre-upgrading VMM.

In accordance with an aspect of the present disclosure, provided is a virtual machine live migration method, including: executing the aforementioned virtual machine deployment method, so as to map an HPA space for a pre-upgrading virtual machine to an HVA space for a post-upgrading virtual machine; and sending signaling to a post-upgrading VMM, so as to set a VCPU of the post-upgrading virtual machine into a running state. An HPA space for the post-upgrading virtual machine is the HPA space for the pre-upgrading virtual machine.

In accordance with an aspect of the present disclosure, provided is a VMM upgrading method, including: deploying a post-upgrading VMM onto a host; starting a pre-upgrading VMM and the post-upgrading VMM on the host at the same time; executing the aforementioned virtual machine live migration method, so as to migrate a pre-upgrading virtual machine running on the pre-upgrading VMM to a post-upgrading virtual machine running on the post-upgrading VMM; and deleting the pre-upgrading VMM.

In accordance with an aspect of the present disclosure, provided is a server configured as a host for a virtual machine. The server includes: a memory module, storing an application program; and one or more processors. The application program, when executed by the one or more processors, causes the one or more processors to carry out one of: the aforementioned virtual machine deployment method; the aforementioned virtual machine live migration method; and the aforementioned VMM upgrading method.

In accordance with an aspect of the present disclosure, provided is a computer-readable storage medium storing an executable program which, when executed by a processor, causes the processor to carry out one of: the aforementioned virtual machine deployment method; the aforementioned virtual machine live migration method; and the aforementioned VMM upgrading method.

BRIEF DESCRIPTION OF DRAWINGS

The accompanying drawings are used to provide a further understanding of the present disclosure and constitute part of the specification. The accompanying drawings are used together with the following specific embodiments to explain the present disclosure, without constituting a limitation to the present disclosure. In the accompanying drawings:

FIG. 1 is a flowchart of an embodiment of a deployment method according to the present disclosure;

FIG. 2 is a schematic diagram of each memory concept and their conversion relationship in a virtualization scenario;

FIG. 10 is a schematic diagram of memory mapping between virtual machines before and after the execution of the virtual machine deployment method in the present disclosure.

DETAILED DESCRIPTION

Figure 3:
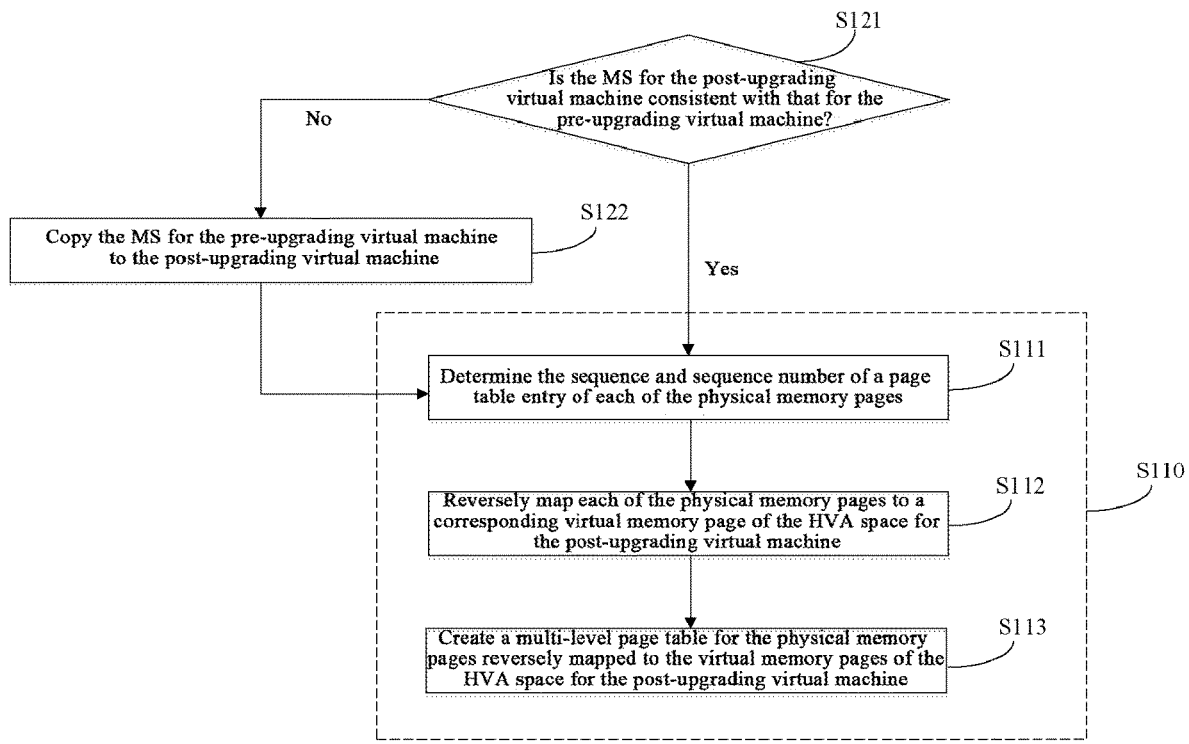
FIG. 3 is a flowchart of another embodiment of the virtual machine deployment method according to the present disclosure.

Specific embodiments of the present disclosure will be illustrated in detail below with reference to the accompanying drawings. It should be understood that the specific embodiments described herein are merely intended to illustrate and explain the present disclosure rather than limit the present disclosure.

In accordance with an aspect of the present disclosure, a virtual machine deployment method is provided, as shown in FIG. 1, including the following step.

At S110, mapping between a host virtual address (HVA) space for a post-upgrading virtual machine and a host physical address (HPA) space for a pre-upgrading virtual machine is established according to a mapping relationship between the HVA space for the pre-upgrading virtual machine and a HPA space for the pre-upgrading virtual machine, the post-upgrading virtual machine being deployed on a post-upgrading virtual machine monitor (VMM) and the memory configuration of the post-upgrading virtual machine being identical with that of the pre-upgrading virtual machine running on a pre-upgrading VMM.

As shown in FIG. 2, a guest page table (GPT) provides a mapping relationship from a guest virtual address (GVA) space to a guest physical address (GPA) space; a host page table (HPT) provides a mapping relationship from a host virtual address (HVA) space to a host physical address (HPA) space; and a memory slot (MS) maps GPAs to HVAs according to sequence numbers.

It should be noted that all page address offsets mentioned in the present disclosure are page address offsets relative to entry addresses of respective address spaces. For example, the page address offsets of virtual memory pages of the HVA space are page address offsets relative to the entry address of the HVA space, and the page address offsets of physical memory pages of the HPA space are page address offsets relative to the entry address of the HPA space.

In the present disclosure, when the virtual machine is deployed, the post-upgrading virtual machine is started on the post-upgrading VMM first, so that the memory configuration of the post-upgrading virtual machine is consistent with that of the pre-upgrading virtual machine running on the pre-upgrading VMM, but no actual physical memory is allocated to the post-upgrading virtual machine. Since the memory configuration and initialization process of the post-upgrading virtual machine are consistent with those of the pre-upgrading virtual machine, the GPA-to-HVA mapping relationship of the post-upgrading virtual machine is also consistent with that of the pre-upgrading virtual machine. In some embodiments, the MS for the post-upgrading virtual machine is consistent with that for the pre-upgrading virtual machine, that is, the pages of the GPA space for the post-upgrading virtual machine and the pages of the GPA space for the pre-upgrading virtual machine respectively corresponding to the pages of the HVA space for the post-upgrading virtual machine and the pages of the HVA space for the pre-upgrading virtual machine with the identical sequence numbers have the identical sequence numbers. In addition, the pages of the GPA space for the post-upgrading virtual machine and the pages of the GPA space for the pre-upgrading virtual machine respectively corresponding to the virtual memory pages of the HVA space for the post-upgrading virtual machine and the virtual memory pages of the HVA space for the pre-upgrading virtual machine with the identical page offsets also have the identical page offsets.

The mapping relationship between the address space for the pre-upgrading virtual machine and the address space for the post-upgrading virtual machine will be further illustrated below with reference to FIG. 10. In FIG. 10(a), both the pre-upgrading VMM and the post-upgrading VMM are deployed on a server, and the post-upgrading virtual machine is started on the post-upgrading VMM, but no actual physical memory HPA space is allocated to the post-upgrading virtual machine. Since the memory configuration and initialization process of the virtual machine on the pre-upgrading VMM are consistent with those of the virtual machine on the post-upgrading VMM, the mapping relationship between the GPA space and the HVA space for the pre-upgrading virtual machine is identical with the mapping relationship between the GPA space and the HVA space for the post-upgrading virtual machine. In FIG. 10, the numbers 1, 2 and 3 may represent the sequence numbers of the memory pages in the corresponding MS or the page address offsets of the memory pages in the address space. Therefore, as shown in FIG. 10(a), when the numbers 1, 2 and 3 in the drawing represent sequence numbers, the sequence numbers of both the page of the GPA space for the post-upgrading virtual machine and the page of the GPA space for the pre-upgrading virtual machine respectively corresponding to the page of the HVA space for the post-upgrading virtual machine and the page of the HVA space for the pre-upgrading virtual machine with the sequence number of 1 are 1, and the sequence numbers of both the page of the GPA space for the post-upgrading virtual machine and the page of the GPA space for the pre-upgrading virtual machine respectively corresponding to the page of the HVA space for the post-upgrading virtual machine and the page of the HVA space for the pre-upgrading virtual machine with the sequence number of 2 are 2. When the numbers 1, 2 and 3 in the drawing represent page address offsets, the page address offsets of both the page of the GPA space for the post-upgrading virtual machine and the page of the GPA space for the pre-upgrading virtual machine respectively corresponding to the page of the HVA space for the post-upgrading virtual machine and the page of the HVA space for the pre-upgrading virtual machine with the page address offset of 1 are 1, and the page address offsets of both the page of the GPA space for the post-upgrading virtual machine and the page of the GPA space for the pre-upgrading virtual machine respectively corresponding to the page of the HVA space for the post-upgrading virtual machine and the page of the HVA space for the pre-upgrading virtual machine with the page address offset of 2 are 2. It should be noted that when the numbers 1, 2 and 3 in the drawing represent page address offsets, FIG. 10 only exemplarily depicts the case that the page address offsets of the pages of the GPA space are equal to those of the pages of the corresponding HVA space. In practical application, the page address offsets of the pages of the GPA space may not be equal to those of the pages of the corresponding HVA space, as long as it is ensured that the pages of the GPA space for the post-upgrading virtual machine and the pages of the GPA space for the pre-upgrading virtual machine respectively corresponding to the virtual memory pages of the HVA space for the post-upgrading virtual machine and the virtual memory pages of the HVA space for the pre-upgrading virtual machine with the identical page offsets also have the identical page offsets. For example, the page address offsets of both the page of the GPA space for the post-upgrading virtual machine and the page of the GPA space for the pre-upgrading virtual machine respectively corresponding to the page of the HVA space for the post-upgrading virtual machine and the page of the HVA space for the pre-upgrading virtual machine with the page address offset of 1 are 3.

In the present disclosure, according to the mapping relationship between the host virtual address (HVA) space for the pre-upgrading virtual machine and the host physical address (HPA) space for the pre-upgrading virtual machine, the HPA space for the pre-upgrading virtual machine is reversely mapped to the HVA space for the post-upgrading virtual machine, physical memory pages found by multi-level query are identical with the physical pages of the HPA space corresponding to the pages of the HVA space for the pre-upgrading virtual machine with the identical sequence numbers or page address offsets when the post-upgrading virtual machine accesses the pages of the HVA space, that is, the post-upgrading virtual machine can access the same physical memory pages as the pre-upgrading virtual machine, and thereby the deployment of the post-upgrading virtual machine is completed.

This will be further illustrated below with reference to FIG. 10. As shown in FIG. 10(a), in the HVA space for the pre-upgrading virtual machine, the page with the sequence number of 1 corresponds to the physical memory page p1 of the HPA space, the page with the sequence number of 2 corresponds to the physical memory page p2 of the HPA space, and the page with the sequence number of 3 corresponds to the physical memory page p3 of the HPA space. At S110 of the present disclosure, the HPA space for the pre-upgrading virtual machine is reversely mapped to the HVA space for the post-upgrading virtual machine. That is, as shown in FIG. 10(b), in the HVA space for the post-upgrading virtual machine, the page with the sequence number of 1 corresponds to the physical memory page p1 of the HPA space, the page with the sequence number of 2 corresponds to the physical memory page p2 of the HPA space, and the page with the sequence number of 3 corresponds to the physical memory page p3 of the HPA space. That is, the post-upgrading virtual machine and the pre-upgrading virtual machine correspond to the identical HPA space. As described above, the mapping relationship between the GPA space and the HVA space for the pre-upgrading virtual machine is identical with the mapping relationship between the GPA space and the HVA space for the post-upgrading virtual machine, so all the levels of mapping relationships between the GVA space, the GPA space, the HVA space and the HPA space for the post-upgrading virtual machine are identical with those between the GVA space, the GPA space, the HVA space and the HPA space for the pre-upgrading virtual machine, as shown in FIG. 10. In FIG. 10(b), after the pre-upgrading VMM is deleted and the post-upgrading virtual machine is started, the physical memory pages which a program running on the post-upgrading virtual machine accesses by multi-level query are identical with the physical memory pages which the program running on the pre-upgrading virtual machine accesses.

As shown in FIG. 10, At S110, contents of the physical memory pages are not copied, but mapping between the HVA space for the post-upgrading virtual machine and the HPA space for the pre-upgrading virtual machine is established only by copying or modifying page table entries (PTEs). Therefore, the whole process of establishing the mapping relationship is very fast, and there is no need to reserve a large quantity of memory resources.

According to the virtual machine deployment method provided by the present disclosure, in the process of deploying the virtual machine, only the mapping relationship between the host virtual address (HVA) space and the host physical address (HPA) space (achieved by copying or modifying the page table entries (PTEs)), rather than the contents of the whole memory space for the virtual machine, is copied, so the mapping relationship between the HVA space for the post-upgrading virtual machine and the HPA space for the pre-upgrading virtual machine can be established without interrupting virtual machine services and reserving a large quantity of computing resources. When employed in a virtual machine migration process, the virtual machine deployment method can realize migration from a pre-upgrading virtual machine to a post-upgrading virtual machine, thus live replacing an old version of VMM software by a new one. Moreover, the virtual machine deployment method is also applicable to the batch live migration of a large number of virtual machines, so that time cost and resource cost can be effectively reduced.

In the present disclosure, when the post-upgrading virtual machine accesses the pages of the HVA space, in order to ensure that physical memory pages found by multi-level query are identical with the physical pages of the HPA space corresponding to the pages of the HVA space for the pre-upgrading virtual machine with the identical sequence numbers or page address offsets, the MS for the post-upgrading virtual machine should be consistent with that for the pre-upgrading virtual machine. In order to ensure that the MS for the post-upgrading virtual machine should be consistent with that for the pre-upgrading virtual machine, as shown in FIG. 3, after the post-upgrading virtual machine is started, the virtual machine deployment method may further include steps S121 to S122.

At S121, whether the memory slot (MS) for the post-upgrading virtual machine is consistent with that for the pre-upgrading virtual machine is judged.

If not, at S122, the MS for the pre-upgrading virtual machine is copied to the post-upgrading virtual machine.

In the present disclosure, the order of S121 or S110 is not specially limited, that is, S121 may be executed prior to or after S110. In the embodiment shown in FIG. 3, S121 is executed prior to S110.

In the present disclosure, there is no special limitation on how to implement S110. As an alternative embodiment, as shown in FIG. 3, in some embodiments, S110 includes steps S111 to S112.

At S111, the sequence and sequence number of a page table entry of each of the physical memory pages in the HPA space for the pre-upgrading virtual machine are determined.

At S112, according to the corresponding relationship between the page table entry of each of the physical memory pages and the sequence number, each of the physical memory pages is reversely mapped to a corresponding virtual memory page of the HVA space for the post-upgrading virtual machine.

In the present disclosure, the page table entry of a physical memory page of the HPA space corresponding to the HVA space for the pre-upgrading virtual machine can be searched according to the entry address and size information of the HVA space for the pre-upgrading virtual machine. After the sequence of the page table entry of each of the physical memory pages is determined, a list may be created, and each of the physical memory pages and its sequence number in the sequence are sequentially saved into the aforementioned list according to the sequence.

In the present disclosure, there is no specific limitation on how to reversely map the physical memory pages to the virtual memory pages of the HVA space for the post-upgrading virtual machine, as long as it is ensured that physical memory pages found by multi-level query are identical with the physical pages of the HPA space corresponding to the pages of the HVA space for the pre-upgrading virtual machine with the identical sequence numbers or page address offsets when the post-upgrading virtual machine accesses the pages of the HVA space, and all reverse mapping methods shall fall within the scope of the present disclosure.

In order to save the memory space, multi-level page tables are employed in memory management. When a complete multi-level page table is created for the physical memory pages reversely mapped to the virtual memory pages of the HVA space for the post-upgrading virtual machine, the page table entries of the physical memory pages of the HPA space are ultimately switched from the HVA space for the pre-upgrading virtual machine to the HVA space for the post-upgrading virtual machine. Accordingly, as shown in FIG. 3, after S112, S110 further includes the following step.

At S113, a multi-level page table is created for the physical memory pages reversely mapped to the virtual memory pages of the HVA space for the post-upgrading virtual machine.

Figure 4:
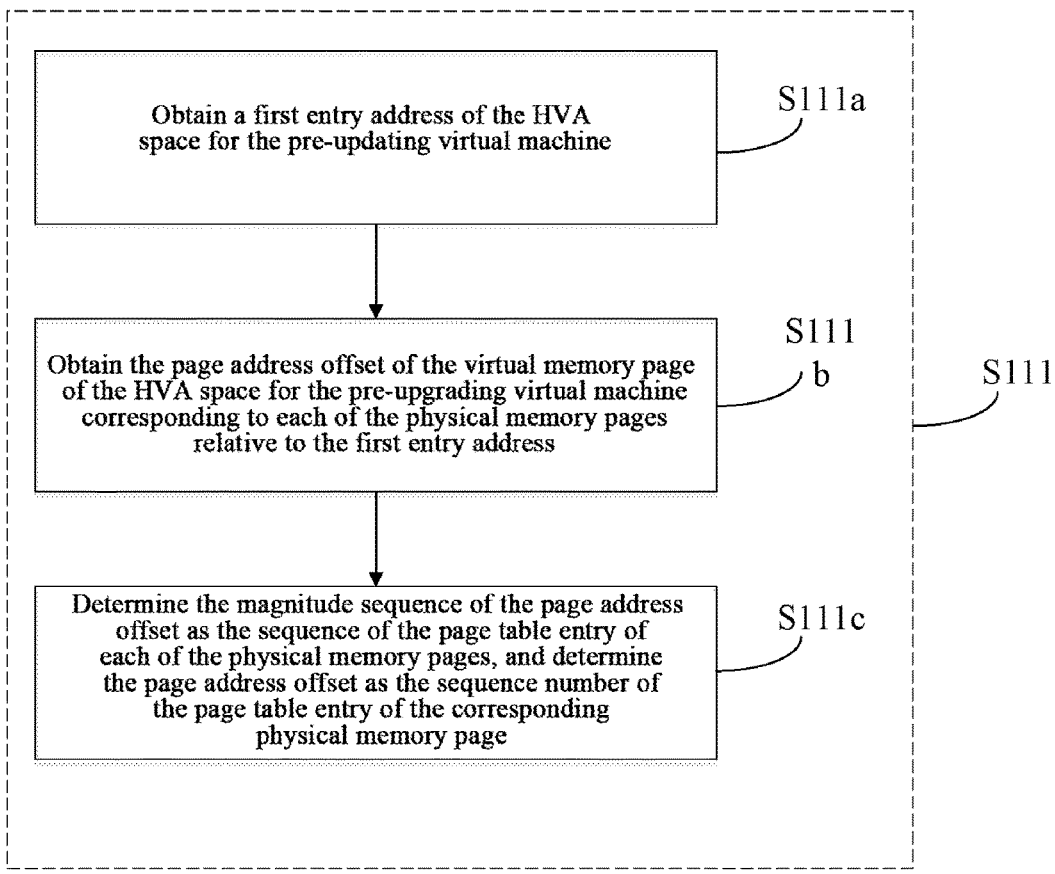
FIG. 4 is a flowchart of yet another embodiment of the virtual machine deployment method according to the present disclosure.

It can be known from the above analysis that the pages of the GPA space for the post-upgrading virtual machine and the pages of the GPA space for the pre-upgrading virtual machine respectively corresponding to the virtual memory pages of the HVA space for the post-upgrading virtual machine and the virtual memory pages of the HVA space for the pre-upgrading virtual machine with the identical page address offsets also have the identical page address offsets. Therefore, as shown in FIG. 4, in some embodiments, S111 may include steps S111a to S111c.

At S111a, a first entry address of the HVA space for the pre-updating virtual machine is obtained;

At S111b, the page address offset of the virtual memory page of the HVA space for the pre-upgrading virtual machine corresponding to each of the physical memory pages relative to the first entry address is obtained; and At S111c, the magnitude sequence of the page address offset is determined as the sequence of the page table entry of each of the physical memory pages, and the page address offset is determined as the sequence number of the page table entry of the corresponding physical memory page.

As shown in FIG. 10, when the numbers 1, 2 and 3 in the drawing represent page address offsets, in the HVA space for the pre-upgrading virtual machine, the page with the page address offset of 1 corresponds to the physical memory page p1 of the HPA space, the page with the page address offset of 2 corresponds to the physical memory page p2 of the HPA space, and the page with the page address offset of 3 corresponds to the physical memory page p3 of the HPA space. Therefore, the sequence number corresponding to the physical memory page p1 is 1, the sequence number corresponding to the physical memory page p2 is 2, and the sequence number corresponding to the physical memory page p3 is 3.

In the present disclosure, the corresponding relationship between the page address offsets of a physical memory page and a virtual memory page corresponding to the physical memory page can be obtained through a host page table (HPT). The page table entry of each of the physical memory pages may be sequenced according to the increment, decrement or any other way of the offsets, which is not particularly limited.

Figure 5:
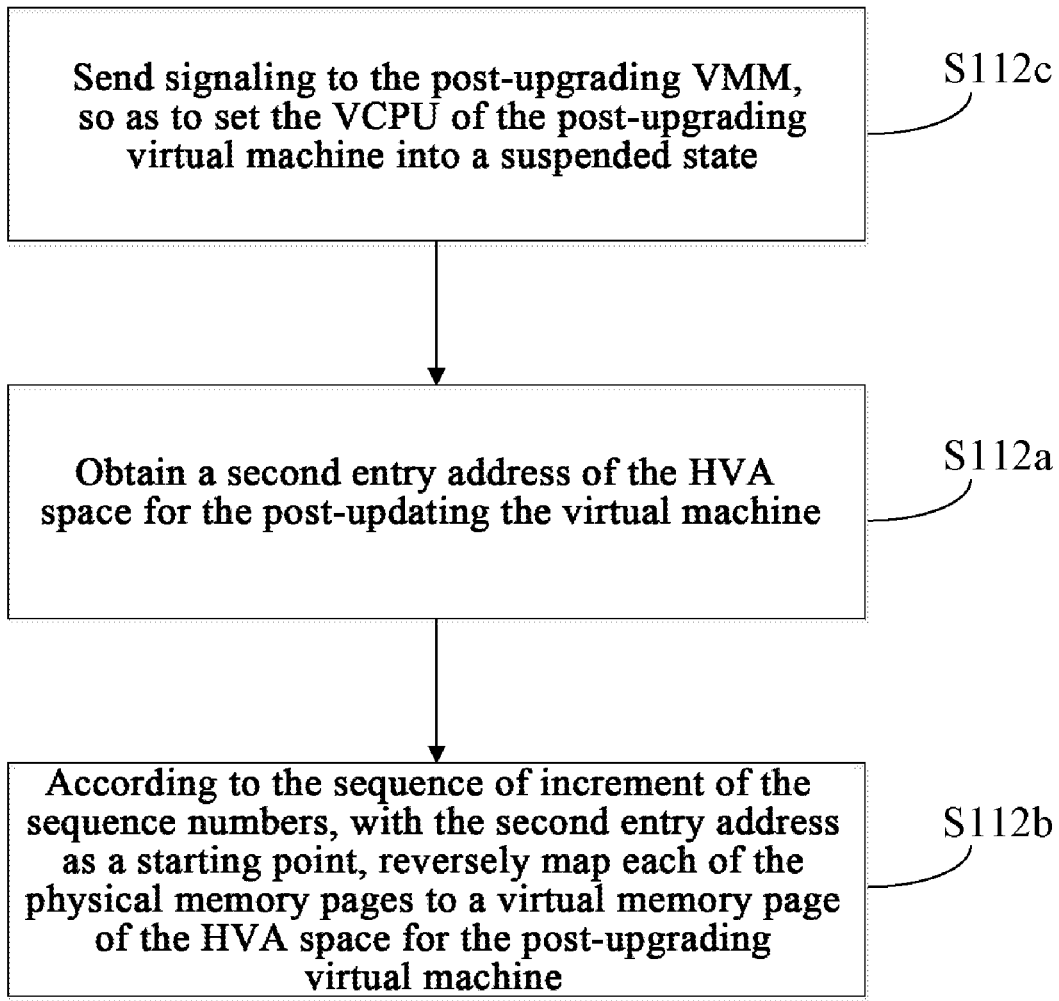
FIG. 5 is a flowchart of still another embodiment of the virtual machine deployment method according to the present disclosure.

In the present disclosure, there is no special limitation on how to implement S112. As an alternative embodiment, as shown in FIG. 5, in some embodiments, S112 includes steps S112a to S112b.

At S112a, a second entry address of the HVA space for the post-updating the virtual machine is obtained.

At S112b, according to the sequence of increment of the sequence numbers, with the second entry address as a starting point, each of the physical memory pages is reversely mapped to a virtual memory page of the HVA space for the post-upgrading virtual machine, the page address offset of the virtual memory page corresponding to each of the physical memory pages relative to the second entry address being equal to the sequence number corresponding to the page table entry of the physical memory page.

In the present disclosure, the page table entries of the physical memory pages of the HPA space for the pre-upgrading virtual machine are reversely mapped to the virtual memory pages of the HVA space for the target virtual machine with the page address offsets equal to those corresponding to the page table entries of the physical memory pages by utilizing a memory page reverse mapping mechanism (rmap), that is, the physical memory pages are reversely mapped to the virtual memory pages of the HVA space for the target virtual machine with the page address offsets equal to those corresponding to the page table entries of the physical memory pages.

In order to prevent a Virtual Central Processing Unit (VCPU) of the post-upgrading virtual machine from generating a page fault interrupt during running, before the execution of S112b, the virtual machine deployment method further includes the following step.

At S112c, signaling is sent to the post-upgrading VMM, so as to set the VCPU of the post-upgrading virtual machine into a suspended state.

The order of S112a or S112c is not particularly limited, that is, S112a may be executed first and then S112c, S112c may be executed first and then S112a or S112c may be executed at the same time as S112a, as long as it is ensured that S112c is executed prior to S112b.

It should be pointed out that "page fault interrupt" herein refers to an interrupt which is issued by a memory management unit of a central processing unit of a server when a post-upgrading virtual machine accesses a physical memory, because virtual memory pages of an HVA space for the post-upgrading virtual machine fail to be mapped to the physical memory and an extended page table (EPT) for the post-upgrading virtual machine is empty.

In some specific application scenarios, in the process of executing S112b to reversely map the physical memory pages to the virtual memory pages of the HVA space for the post-upgrading virtual machine, the VCPU of the pre-upgrading virtual machine may be temporarily suspended. The time which is taken to reversely map all the physical memory pages to the virtual memory pages of the HVA space for the post-upgrading virtual machine is the time for which the VCPU of the pre-upgrading virtual machine is suspended, generally not exceeding 1 second.

In some other specific application scenarios, in the process of executing S112b to reversely map the physical memory pages to the virtual memory pages of the HVA space for the post-upgrading virtual machine, the physical memory pages may be temporarily set into a fixed state, and after the physical memory pages are reversely mapped to the virtual memory pages of the HVA space for the post-upgrading virtual machine, the fixed state of the physical memory pages is released.

By temporarily suspending the VCPU of the pre-upgrading virtual machine or temporarily setting the physical memory pages into the fixed state, the VCPU of the pre-upgrading virtual machine can be prevented from modifying, adding or deleting physical memory pages, ensuring that the page table or page contents of the physical memory pages can keep consistent before and after the physical memory pages are reversely mapped to the virtual memory pages of the HVA space for the post-upgrading virtual machine, so that a service program can successively run on the pre-upgrading virtual machine and the post-upgrading virtual machine.

Figure 6:
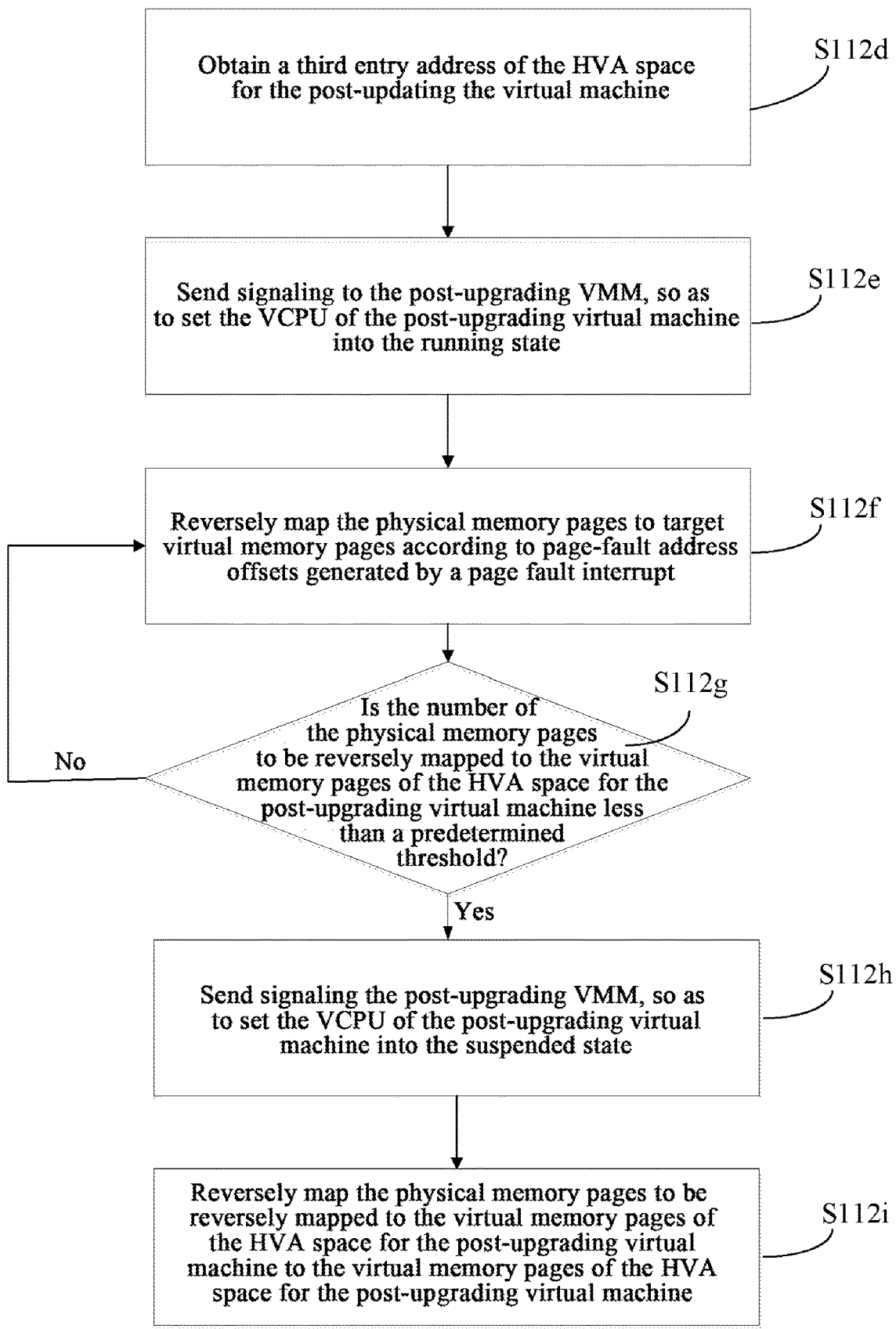
FIG. 6 is a flowchart of a still another embodiment of the virtual machine deployment method according to the present disclosure.

Although the aforementioned embodiment of implementing S112 through S112a and S112b is simple in flow and easy to implement, when the physical memory to be reversely mapped to the HVA space for the post-upgrading virtual machine is large, setting the VCPU of the pre-upgrading virtual machine in the suspended state for a long time will usually cause services to suspend for up to about 1 second, so this embodiment is only suitable for live migration of virtual machines with small memories. In order to shorten the time of suspension of the service program running on the virtual machine caused by the reverse mapping of the physical memory pages to the virtual memory pages of the HVA space for the post-upgrading virtual machine in order to be adapted to the live migration of virtual machines with large memories, the present disclosure further provides an embodiment which can actively trigger a page fault interrupt to execute S112. In this embodiment, as shown in FIG. 6, in some embodiments, S112 includes steps S112d to S112i.

At S112d, a third entry address of the HVA space for the post-updating the virtual machine is obtained.

At S112e, signaling is sent to the post-upgrading VMM, so as to set the VCPU of the post-upgrading virtual machine into the running state.

At S112f, the physical memory pages are reversely mapped to target virtual memory pages according to page-fault address offsets generated by a page fault interrupt, the target virtual memory pages being the virtual memory pages of the HVA space for the post-upgrading virtual machine, the sequence numbers of the page table entries of the physical memory pages being equal to the page-fault address offsets and page address offsets of the target virtual memory pages relative to the third entry address being equal to the page-fault address offsets.

Because no actual physical memory is allocated to the post-upgrading virtual machine, when the post-upgrading VCPU runs and accesses the memory, a page fault interrupt may be generated, and page-fault address offsets may be generated. The page-fault address offsets correspond to the page address offsets of the virtual memory pages of the HVA space for the post-upgrading virtual machine.

In order to further shorten the time of suspension of the aforementioned service program, page faults of the memory for the post-upgrading virtual machine and the switching of the physical memory pages of the HPA space may be tracked in the running process of the post-upgrading virtual machine. Moreover, at S112g, whether the number of the physical memory pages to be reversely mapped to the virtual memory pages of the HVA space for the post-upgrading virtual machine is less than a predetermined threshold is judged.

At S112h, if the number of the physical memory pages to be reversely mapped to the virtual memory pages of the HVA space for the post-upgrading virtual machine is less than the predetermined threshold, signaling is sent to the post-upgrading VMM, so as to set the VCPU of the post-upgrading virtual machine into the suspended state.

At S112i, the physical memory pages to be reversely mapped to the virtual memory pages of the HVA space for the post-upgrading virtual machine are reversely mapped to the virtual memory pages of the HVA space for the post-upgrading virtual machine, the page address offset of the virtual memory page corresponding to each of the physical memory pages relative to the third entry address being equal to the sequence number corresponding to the page table entry of the physical memory page.

At this point, because the number of the physical memory pages to be reversely mapped to the virtual memory pages of the HVA space for the post-upgrading virtual machine at a time is very small, the time of suspension of the VCPU of the post-upgrading virtual machine may be controlled at the microsecond level, the service program in the virtual machine may not be aware of the aforementioned suspension, so service suspension or interruption may not be caused.

The embodiment of determining the sequence of the page table entry of each of the physical memory pages according to the page address offsets of the virtual memory pages of the HVA space for the pre-upgrading virtual machine and reversely mapping the physical memory pages to the virtual memory pages of the HVA space for the post-upgrading virtual machine has been described in detail above. Of course, the present disclosure is not limited to this, and any sequencing method which can reflect the mapping relationship between the HVA space for the pre-upgrading virtual machine and the HPA space for the pre-upgrading virtual machine shall fall within the scope of the present disclosure. Another embodiment of determining the sequence of the page table entry of each of the physical memory pages will be introduced below.

Figure 7:
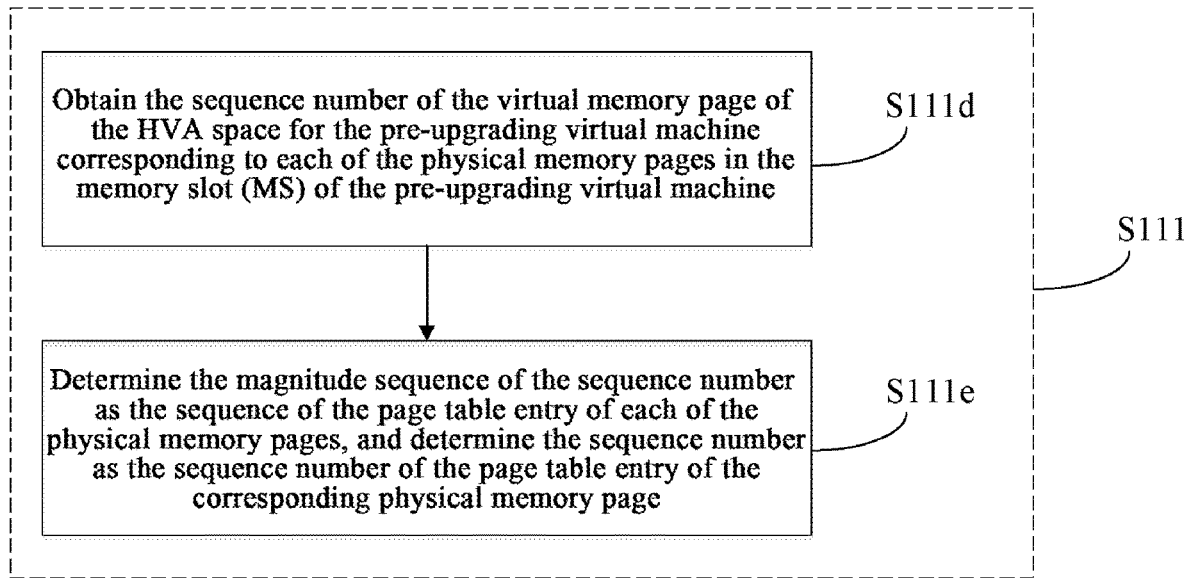
FIG. 7 is a flowchart of a still another embodiment of the virtual machine deployment method according to the present disclosure.

It can be known from the above analysis that the MS for the post-upgrading virtual machine is consistent with that for the pre-upgrading virtual machine, that is, the pages of the GPA space for the post-upgrading virtual machine and the pages of the GPA space for the pre-upgrading virtual machine respectively corresponding to the pages of the HVA space for the post-upgrading virtual machine and the pages of the HVA space for the pre-upgrading virtual machine with the identical sequence numbers in the MS have the identical sequence numbers in the MS. Therefore, in the present disclosure, as shown in FIG. 7, in some embodiments, S111 may include steps S111d to S111e.

At S111d, the sequence number of the virtual memory page of the HVA space for the pre-upgrading virtual machine corresponding to each of the physical memory pages in the memory slot (MS) of the pre-upgrading virtual machine is obtained.

At S111e, the magnitude sequence of the sequence number is determined as the sequence of the page table entry of each of the physical memory pages, and the sequence number is determined as the sequence number of the page table entry of the corresponding physical memory page.

As shown in FIG. 10, when the numbers 1, 2 and 3 in the drawing represent sequence numbers, in the HVA space for the pre-upgrading virtual machine, the page with the sequence number of 1 corresponds to the physical memory page p1 of the HPA space, the page with the sequence number of 2 corresponds to the physical memory page p2 of the HPA space, and the page with the sequence number of 3 corresponds to the physical memory page p3 of the HPA space. Therefore, the sequence number corresponding to the physical memory page p1 is 1, the sequence number corresponding to the physical memory page p2 is 2, and the sequence number corresponding to the physical memory page p3 is 3.

Figure 8:
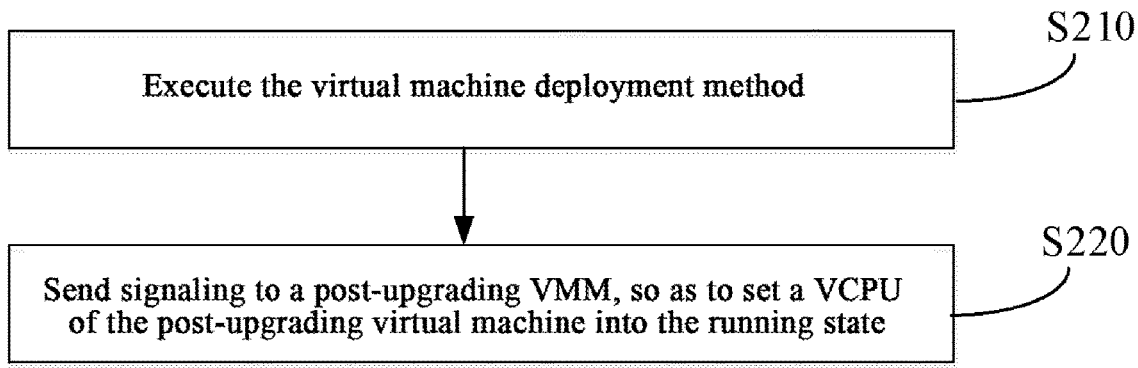
FIG. 8 is a flowchart of an embodiment of a virtual machine live migration method according to the present disclosure.

In accordance with an aspect of the present disclosure, a virtual machine live migration method is provided, as shown in FIG. 8, including steps S210 to S220.

At S210, the aforementioned virtual machine deployment method is executed, so as to map an HPA space for a pre-upgrading virtual machine to an HVA space for a post-upgrading virtual machine.

At S220, signaling is sent to a post-upgrading VMM, so as to set a VCPU of the post-upgrading virtual machine into a running state, an HPA space for the post-upgrading virtual machine being the HPA space for the pre-upgrading virtual machine.

FIG. 10 is a schematic diagram showing memory mapping before and after the live migration of a virtual machine by the virtual machine live migration method according to the present disclosure. FIG. 10(a) shows memory mapping before the live migration of the virtual machine, and FIG. 10(b) shows memory mapping after the live migration of the virtual machine. It can be seen that the virtual machine runs on the identical HPA space before and after live migration, and because contents of physical memory pages are not copied, the whole process of live migration is very fast, so a service program of the virtual machine may not be aware of the process of live migration.

According to the virtual machine live migration method provided by the present disclosure, the virtual machine deployment method provided by the present disclosure is employed to deploy a post-upgrading virtual machine by establishing a mapping relationship between an HVA space for the post-upgrading virtual machine and an HPA space for a pre-upgrading virtual machine; in the process of migrating the virtual machine, only the mapping relationship between the host virtual address (HVA) space and the host physical address (HPA) space (achieved by copying or modifying page table entries (PTEs)), rather than contents of the whole memory space for the virtual machine, is copied, so the pre-upgrading virtual machine can be migrated to the post-upgrading virtual machine without interrupting a virtual machine service and reserving a large quantity of computing resources, thus achieving the migration from the pre-upgrading virtual machine to the post-upgrading virtual machine. Moreover, the virtual machine live migration method is also applicable to the batch live migration of a large number of virtual machines, so that time cost and resource cost can be effectively reduced.

Figure 9:
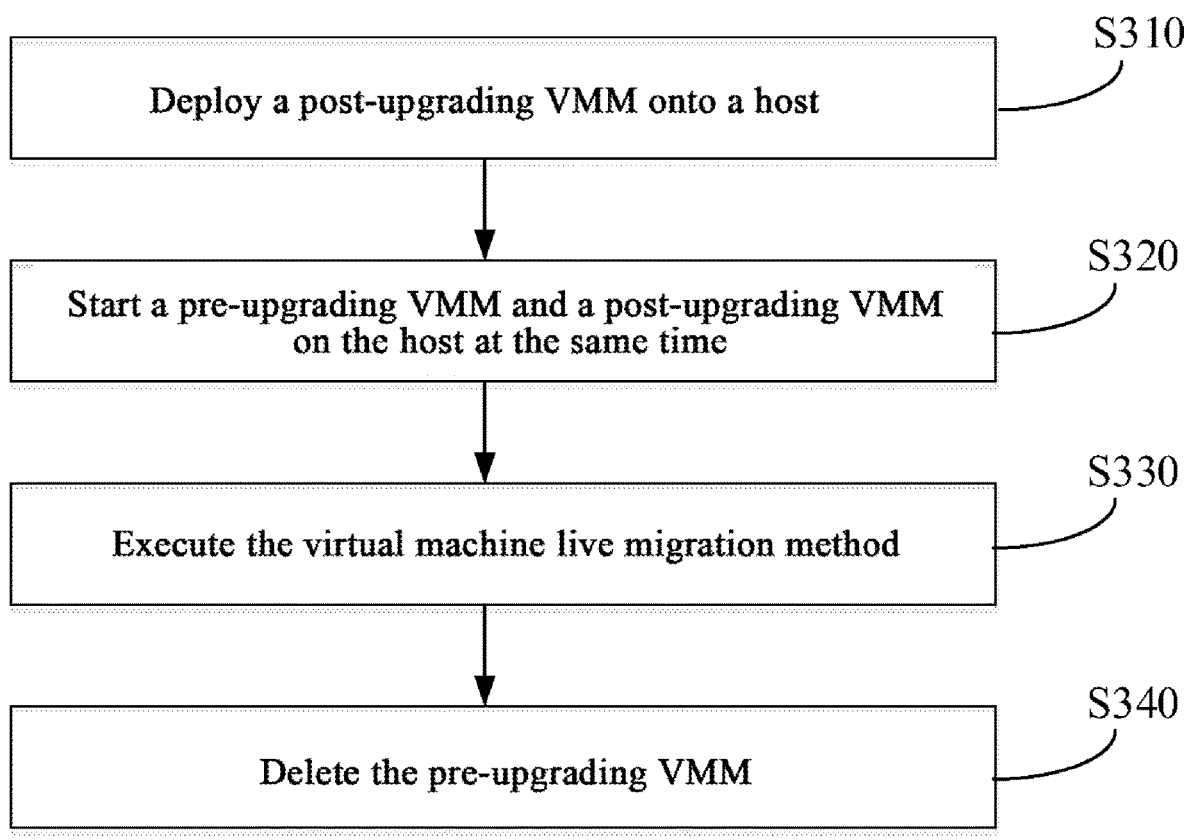
FIG. 9 is a flowchart of an embodiment of a VMM upgrading method according to the present disclosure.

In accordance with an aspect of the present disclosure, a VMM upgrading method is provided. As shown in FIG. 9, the VMM upgrading method includes steps S310 to S340.

At S310, a post-upgrading VMM is deployed onto a host.

At S320, a pre-upgrading VMM and a post-upgrading VMM are started on the host at the same time.

At S330, the aforementioned virtual machine live migration method is executed, so as to migrate a pre-upgrading virtual machine running on the pre-upgrading VMM to a post-upgrading virtual machine running on the post-upgrading VMM.

At S340, the pre-upgrading VMM is deleted.

It should be noted that when a virtual machine is live migrated by the existing technology, in order to ensure that a virtual machine service is unaware of the migration process, it is necessary to copy back-end device information of the pre-upgrading virtual machine saved by the pre-upgrading VMM into the post-upgrading VMM. Therefore, the VMM upgrading method provided by the present disclosure certainly includes the aforementioned step of copying the back-end device information of the pre-upgrading virtual machine saved by the pre-upgrading VMM into the post-upgrading VMM.

In addition, because an extended page table (EPT) of the post-upgrading virtual machine in a server kernel is initially empty, with the running of the post-upgrading virtual machine, the server kernel may start to create an EPT of the post-upgrading virtual machine according to an MS consistent with that of the pre-upgrading virtual machine, thus realizing a high-speed conversion from GPAs to HPAs.

According to the VMM upgrading method provided by the present disclosure, the virtual machine live migration method provided by the present disclosure is employed to live migrate the virtual machine running on the VMM, thus realizing live upgrading of the VMM, so that time cost and resource cost can be effectively reduced.

At present, commonly used VMM software includes VMware's vSphere, Microsoft Hyper-V, pre-upgrading QEMU, XEN, KVM, etc. Taking QEMU-KVM and XEN as examples, the virtual machine deployment method, the virtual machine live migration method and the VMM upgrading method provided by the present disclosure will be further illustrated respectively below.

Example Embodiment One

The present embodiment runs on an x86 server, Intel® Xeon® CPU E5-2640 is adopted as a CPU, and the EPT function has been enabled. The operating system runs the kernel of LINUX v2.6, and QEMU-KVM is adopted as a VMM (Hypervisor) for virtualization on which a Windows 7 system virtual machine which is being used by a service user is running.

The virtual machine of the user is normally running on pre-upgrading QEMU, a mapping relationship between a GPA space used by the operating system (Windows 7) in a pre-upgrading virtual machine and an HVA space for a pre-upgrading QEMU process is established through a kvm_memory_slot data structure maintained by a KVM module of the kernel, and the HVA space is mapped to physical memory pages of the GPA space through a multi-level page table which is maintained by the LINUX kernel of the server and includes PTEs.

A post-upgrading virtual machine is created on post-upgrading QEMU through KVM, but no actual physical memory is allocated to the post-upgrading virtual machine, and a VCPU of the post-upgrading virtual machine is set into the suspended state.

A connection is established between a migration execution thread of the pre-upgrading QEMU program and a migration thread of the post-upgrading QEMU program through the Transmission Control Protocol (TCP), and back-end device information, of virtual network adapters, virtio and the like is synchronized.

A VCPU of the pre-upgrading virtual machine is set into the suspended state.

The step of S111a in the virtual machine deployment method provided by the aspect of the present disclosure is executed by the following step.

The starting address of the HVA space for the pre-upgrading virtual machine is obtained.

The step of S111b in the virtual machine deployment method provided in accordance with the aspect of the present disclosure is executed by the following steps.

A virtual memory area (VMA) corresponding to the HVA space is found in the kernel according to the starting address of the HVA space.

According to the starting address of the HVA space and a red-black tree of the VMA, the multi-level page table corresponding to the old HVA space for the pre-upgrading virtual machine is traversed level by level by utilizing a memory walk mechanism provided by the kernel. For example, for the x86_64 linux kernel in the present embodiment, it is required to traverse a PGD table, a PUD table, a PMD table and the last PTE table in sequence to find pointers of all HVA memory pages (S111b ends).

The step of S111c in the virtual machine deployment method provided by in accordance with the aspect of the present disclosure is executed by the following step.

A list is created to save all the page pointers corresponding to the HVA space for the pre-upgrading virtual machine in order.

The step of S112a in the virtual machine deployment method provided in accordance with the aspect of the present disclosure is executed by the following step.

An entry address of the HVA space for the post-updating virtual machine is obtained.

The step of S112b in the virtual machine deployment method provided in accordance with the aspect of the present disclosure is executed by the following step.

After offsets relative to the entry address are calculated in order, the saved page points above are mapped into the HVA space for the post-upgrading virtual machine by a technique of reversely mapping anonymous pages (page_set_anon_r-map) in the kernel.

The step of S113 in the virtual machine deployment method provided in accordance with the aspect of the present disclosure is executed as follows: a multi-level page table is created.

At this point, the page table is switched from the pre-upgrading virtual machine to the post-upgrading virtual machine.

It is determined that the corresponding relationship between sequence numbers of the GPA space and sequence numbers of the HVA space is consistent in kvm_memory_slot structures of the post-upgrading virtual machine and the pre-upgrading virtual machine. Normally, because the memory configuration and initialization process of the post-upgrading virtual machine are identical with those of the pre-upgrading virtual machine, the mapping relationship in the kvm_memory_slot structures should be consistent. This step is equivalent to S121 provided in accordance with the aspect of the present disclosure. It can be seen that in the present embodiment, S121 is executed after S110.

In the present embodiment, the virtual machine live migration method provided in accordance with the aspect of the present disclosure may be executed according to the following steps.

The step of S210 is executed by each of the steps described above.

The step of S220 is executed as follows: the VCPU of the post-upgrading virtual machine is set into the running state.

Because an EPT of the post-upgrading virtual machine is initially an empty table, by constantly accessing the HVA space during running, the KVM module enters a Page Fault process, and according to the kvm_memory_slot structure in the KVM module consistent with that of the pre-upgrading virtual machine, mapping information is found out, so as to gradually create a new EPT.

Ultimately, the EPT of all the memory pages for the post-upgrading virtual machine is created in the KVM module and brought into effect, realizing high-speed GPA-to-HPA conversion. After it is determined that the post-upgrading virtual machine can normally run, the pre-upgrading QEMU running process is deleted.

Example Embodiment Two

The present embodiment is intended to shorten the time of suspension of a VCPU of a virtual machine during page table switching as much as possible. Both the running software and hardware environment and the states of the host and the virtual machine before QEMU upgrading are identical with those in example Embodiment one. Only the step of reversely mapping an HPA space for a pre-upgrading virtual machine to an HVA space for a post-upgrading virtual machine is different.

The step of S112e in the virtual machine deployment method provided in accordance with the aspect of the present disclosure is executed by the following step.

A VCPU of the post-upgrading virtual machine is set into a running state, and because no actual physical memory is not allocated to an HVA space for the post-upgrading virtual machine, a kernel may generate a page fault interrupt (no_page_fault) when a certain HVA address in the HVA space for the post-upgrading virtual machine is accessed.

The step of S112f in the virtual machine deployment method provided in accordance with the aspect of the present disclosure is executed by the following step.

According to page-fault address offsets needed by the page fault interrupt, points of pages corresponding to the identical offsets are found from saved points of all pages corresponding to the HVA space for the pre-upgrading virtual machine, and are mapped into the HVA space for the post-upgrading virtual machine by a technique of reversely mapping anonymous pages (page_set_anon_r-map) in the kernel.

The step of S113 in the virtual machine deployment method provided in accordance with the aspect of the present disclosure is executed as follows:

a multi-level page table corresponding to the pages is created.

The step of S112g in the virtual machine deployment method provided in accordance with the aspect of the present disclosure is executed as follows:

page faults of the memory for the post-upgrading virtual machine and page table switching are constantly checked.

The step of S112h in the virtual machine deployment method provided in accordance with the aspect of the present disclosure is executed as follows:

when the number of the pages to be switched is less than a threshold, the VCPU of the post-upgrading virtual machine is suspended.

The step of S112i in the virtual machine deployment method provided in accordance with the aspect of the present disclosure is executed as follows:

the rest of the memory is reversely mapped to the HVA space for the post-upgrading virtual machine in one step, and a multi-level page table is created.

During the aforementioned page faults and sequential memory page switching, the KVM module may also gradually create a new EPT according to a kvm_memory_slot structure consistent with that of the pre-upgrading virtual machine. Ultimately, the EPT of all the memory pages for the post-upgrading virtual machine is created in the KVM module and brought into effect, realizing high-speed GPA-to-HPA conversion.

After it is determined that the post-upgrading virtual machine can normally run, the pre-upgrading QEMU running process is deleted.

Example Embodiment Three

The present embodiment adopts XEN as VMM (Hypervisor) software for virtualization.

A post-upgrading virtual machine is created on the post-upgrading XEN hypervisor, but no actual HVA memory is allocated, and a VCPU of the post-upgrading virtual machine is set into a suspended state.

The execution of a VCPU of a pre-upgrading virtual machine is suspended.

The step of S111 in the virtual machine deployment method provided in accordance with the aspect of the present disclosure is executed by the following steps.

An entry address of an HVA space for the pre-upgrading virtual machine is obtained and transmitted into the kernel of the LINUX operating system of the server.

According to a starting address of the HVA space and a red-black tree of a VMA, the memory walk mechanism provided by the kernel is utilized to traverse a multi-level page table corresponding to the HVA space for the old virtual machine level by level, that is, taking the LINUX kernel with the x86_64 architecture as an example, a PGD table, a PUD table, a PMD table and the last PTE table are traversed in sequence to find pointers of all HVA memory pages (S111 ends).

The step of S112 in the virtual machine deployment method provided in accordance with the aspect of the present disclosure is executed by the following steps.

The traversed memory pages corresponding to the HVA space are flagged and pinned by a TestSetPagePinned( ) method of XEN.

An entry address of the HVA space for the post-updating virtual machine is obtained. At the same time, by traversing the page table, whether the memory pages are flagged and pinned is judged by a PagePinned( ) method of XEN.

The pinned pages are mapped to the HVA space for the post-upgrading virtual machine by map_pages_to_xen (S112 ends).

The step of S113 in the virtual machine deployment method provided in accordance with the aspect of the present disclosure is executed by the following step.

A complete corresponding multi-level page stable is created as an actual running memory for the post-upgrading virtual machine. The pinned flags are cleared by a ClearPagePinned( ) method.

In the present embodiment, the virtual machine live migration method provided in accordance with the aspect of the present disclosure may be executed according to the following steps.

The step of S210 is executed by each of the steps described above.

The step of S220 is executed as follows: the VCPU of the post-upgrading virtual machine is set into the running state, so as to automatically create a corresponding shadow page table or EPT page table by constantly accessing the HVA space during running.

After it is determined that the post-upgrading virtual machine can normally run, the pre-upgrading virtual machine process on XEN is deleted.

In accordance with an aspect of the present disclosure, a server is provided, which is configured as a host for a virtual machine. The server includes: a memory module, storing an application program; and one or more processors. The application program, when executed by the one or more processors, causes the one or more processors to carry out one of: the aforementioned virtual machine deployment method; the aforementioned virtual machine live migration method; and the aforementioned VMM upgrading method.

The working principle and beneficial effects of the virtual machine deployment method, the virtual machine live migration method or the VMM upgrading method provided by the present disclosure have been described in detail above, so they will not be repeated here.

In accordance with an aspect of the present disclosure, a computer-readable storage medium is provided which stores an executable program. When executed, the executable program can carry out one of: the aforementioned virtual machine deployment method; the aforementioned virtual machine live migration method; and the aforementioned VMM upgrading method.

According to the virtual machine deployment method, the virtual machine live migration method, the VMM upgrading method, the server and the computer-readable storage medium provided by the embodiments of the present disclosure, in the process of deploying the virtual machine, only the mapping relationship between the host virtual address (HVA) space and the host physical address (HPA) space (achieved by copying or modifying the page table entries (PTEs)), rather than the contents of the whole memory space for the virtual machines, is copied, so the mapping relationship between the HVA space for the post-upgrading virtual machine and the HPA space for the pre-upgrading virtual machine can be established without interrupting virtual machine services and reserving a large quantity of computing resources. When employed in a virtual machine migration process, the virtual machine deployment method can realize migration from a pre-upgrading virtual machine to a post-upgrading virtual machine, thus live replacing an old version of VMM software by a new one. Moreover, the virtual machine deployment method is also applicable to the batch live migration of a large number of virtual machines, so that time cost and resource cost can be effectively reduced.

The computer-readable storage medium includes volatile and nonvolatile, removable and non-removable media implemented in any method or technique for storing information (such as computer-readable instructions, data structures, program modules or other data). The computer-readable storage medium includes, but not limited to, RAM, ROM, EEPROM, flash memory or other memory technologies, CD-ROM, digital versatile disk (DVD) or other optical disk storage, magnetic cassettes, magnetic tapes, magnetic disk storage or other magnetic storage media or any other media that can be used to store desired information and can be accessed by computers.

It can be understood that the above embodiments are only example embodiments intended to illustrate the principle of the present disclosure, but the present disclosure is not limited thereto. For those having ordinary skill in the art, various variations and improvements can be made without departing from the principle and essence of the present disclosure, and these variations and improvements are also regarded as being within the scope of protection of the present disclosure.

The invention claimed is:

1. A virtual machine deployment method, comprising:
establishing mapping between a host virtual address (HVA) space for a post-upgrading virtual machine and a host physical address (HPA) space for a pre-upgrading virtual machine according to a mapping relationship between a HVA space for the pre-upgrading virtual machine and the HPA space for the pre-upgrading virtual machine, wherein
the post-upgrading virtual machine is deployed on a post-upgrading virtual machine monitor (VMM), and
the post-upgrading virtual machine is identical in memory configuration with the pre-upgrading virtual machine running on a pre-upgrading VMM;
wherein establishing mapping between a host virtual address (HVA) space for a post-upgrading virtual machine and a host physical address (HPA) space for a pre-upgrading virtual machine according to a mapping relationship between a HVA space for the pre-upgrading virtual machine and the HPA space for the pre-upgrading virtual machine comprises:
determining a sequence and a sequence number of a page table entry of each of physical memory pages in the HPA space for the pre-upgrading virtual machine; and
reversely mapping each of the physical memory pages to a corresponding virtual memory page of the HVA space for the post-upgrading virtual machine according to a corresponding relationship between the page table entry of each of the physical memory pages and the sequence number;
wherein determining a sequence and a sequence number of a page table entry of each of physical memory pages in the HPA space for the pre-upgrading virtual machine comprises:
obtaining a first entry address of the HVA space for the post-updating virtual machine;
determining a page address offset of the virtual memory page of the HVA space for the pre-upgrading virtual machine corresponding to each of the physical memory pages relative to the first entry address; and
determining a magnitude sequence of the page address offset as the sequence of the page table entry of each of the physical memory pages, and determining the page address offset as the sequence number of the page table entry of the corresponding physical memory page;

wherein reversely mapping each of the physical memory pages to a corresponding virtual memory page of the HVA space for the post-upgrading virtual machine according to a corresponding relationship between the page table entry of each of the physical memory pages and the sequence number comprises:
obtaining a third entry address of the HVA space for the post-updating the virtual machine;
sending signaling to the post-upgrading VMM, so as to set a VCPU of the post-upgrading virtual machine into a running state; and
reversely mapping the physical memory pages to target virtual memory pages according to page-fault address offsets generated by a page fault interrupt, wherein the target virtual memory pages are the virtual memory pages of the HVA space for the post-upgrading virtual machine, the sequence numbers of the page table entries of the physical memory pages are equal to the page-fault address offsets, and page address offsets of the target virtual memory pages relative to the third entry address are equal to the page-fault address offsets.

2. The virtual machine deployment method of claim 1, wherein reversely mapping each of the physical memory pages to a corresponding virtual memory page of the HVA space for the post-upgrading virtual machine according to a corresponding relationship between the page table entry of each of the physical memory pages and the sequence number comprises:
obtaining a second entry address of the HVA space for the post-updating the virtual machine; and
reversely mapping each of the physical memory pages to a virtual memory page of the HVA space for the post-upgrading virtual machine with the second entry address as a starting point according to the sequence of increment of the sequence numbers, wherein the page address offset of the virtual memory page corresponding to each of the physical memory pages relative to the second entry address is equal to the sequence number corresponding to the page table entry of the physical memory page.

3. The virtual machine deployment method of claim 2, wherein before reversely mapping each of the physical memory pages to a virtual memory page of the HVA space for the post-upgrading virtual machine with the second entry address as a starting point according to the sequence of increment of the sequence numbers, the virtual machine deployment method further comprises:
sending signaling to the post-upgrading VMM, so as to set a Virtual Central Processing Unit (VCPU) of the post-upgrading virtual machine into a suspended state.

4. The virtual machine deployment method of claim 1, wherein after reversely mapping the physical memory pages to target virtual memory pages according to page-fault address offsets generated by a page fault interrupt, the virtual machine deployment method further comprises:
judging whether a number of the physical memory pages to be reversely mapped to the virtual memory pages of the HVA space for the post-upgrading virtual machine is less than a predetermined threshold;
in response to that the number of the physical memory pages to be reversely mapped to the virtual memory pages of the HVA space for the post-upgrading virtual machine is less than the predetermined threshold, sending signaling to the post-upgrading VMM, so as to set the VCPU of the post-upgrading virtual machine into the suspended state; and reversely mapping the physical memory pages to be reversely mapped to the virtual memory pages of the HVA space for the post-upgrading virtual machine to the virtual memory pages of the HVA space for the post-upgrading virtual machine, wherein the page address offset of the virtual memory page corresponding to each of the physical memory pages relative to the third entry address is equal to the sequence number corresponding to the page table entry of the physical memory page.

5. The virtual machine deployment method of claim 1, wherein determining the sequence of the page table entry of each of the physical memory pages comprises:

obtaining the sequence number of the virtual memory page of the HVA space for the pre-upgrading virtual machine corresponding to each of the physical memory pages in a memory slot (MS) of the pre-upgrading virtual machine; and determining a magnitude sequence of the sequence number as the sequence of the page table entry of each of the physical memory pages, and determining the sequence number as the sequence number of the page table entry of the corresponding physical memory page.

6. The virtual machine deployment method of claim 1, wherein after reversely mapping each of the physical memory pages to a corresponding virtual memory page of the HVA space for the post-upgrading virtual machine according to a corresponding relationship between the page table entry of each of the physical memory pages and the sequence number, the virtual machine deployment method further comprises:

creating a multi-level page table for the physical memory pages reversely mapped to the virtual memory pages of the HVA space for the post-upgrading virtual machine.

7. The virtual machine deployment method of claim 1, wherein before establishing mapping between a host virtual address (HVA) space for a post-upgrading virtual machine and a host physical address (HPA) space for a pre-upgrading virtual machine according to a mapping relationship between a HVA space for the pre-upgrading virtual machine and the HPA space for the pre-upgrading virtual machine, the virtual machine deployment method further comprises:

judging whether a memory slot (MS) for the post-upgrading virtual machine is consistent with a MS for the pre-upgrading virtual machine; and in response to being not consistent, copying the MS for the pre-upgrading virtual machine to the post-upgrading virtual machine.

8. A virtual machine live migration method, comprising:

executing the virtual machine deployment method of claim 1, so as to map the HPA space for the pre-upgrading virtual machine to the HVA space for the post-upgrading virtual machine; and sending signaling to the post-upgrading VMM, so as to set a VCPU of the post-upgrading virtual machine into a running state, wherein an HPA space for the post-upgrading virtual machine is the HPA space for the pre-upgrading virtual machine.

9. A VMM upgrading method, comprising:

deploying a post-upgrading VMM onto a host;

starting a pre-upgrading VMM and a post-upgrading VMM on the host at the same time;

executing the virtual machine live migration method of claim 8, so as to migrate the pre-upgrading virtual machine running on the pre-upgrading VMM to the post-upgrading virtual machine running on the post-upgrading VMM; and deleting the pre-upgrading VMM.

10. A server, configured as a host for a virtual machine, comprising:

a memory module, storing an application program; and one or more processors, wherein the application program, when executed by the one or more processors, causes the one or more processors to carry out the virtual machine deployment method of claim 1.

11. A non-transitory computer-readable storage medium storing an executable program which, when executed, carries out the virtual machine deployment method of claim 1.

12. A server, configured as a host for a virtual machine, comprising:

a memory module, storing an application program; and one or more processors, wherein the application program, when executed by the one or more processors, causes the one or more processors to carry out the virtual machine live migration method of claim 8.

13. A server, configured as a host for a virtual machine, comprising:

a memory module, storing an application program; and one or more processors, wherein the application program, when executed by the one or more processors, causes the one or more processors to carry out the VMM upgrading method of claim 9.

14. A non-transitory computer-readable storage medium storing an executable program which, when executed, carries out the virtual machine live migration method of claim 8.

15. A non-transitory computer-readable storage medium storing an executable program which, when executed, carries out the VMM upgrading method of claim 9.

* * * * *